United States Patent [19]

Sommer

[11] Patent Number: 4,765,448

[45] Date of Patent: * Aug. 23, 1988

[54] INCHING DRIVE

[75] Inventor: Gordon M. Sommer, Boca Raton, Fla.

[73] Assignee: Sommer Company, Warren, Mich.

[*] Notice: The portion of the term of this patent subsequent to Oct. 14, 2003 has been disclaimed.

[21] Appl. No.: 889,304

[22] Filed: Jul. 17, 1986

Related U.S. Application Data

[63] Continuation of Ser. No. 726,310, Apr. 23, 1985, abandoned, which is a continuation-in-part of Ser. No. 521,243, Aug. 3, 1983, Pat. No. 4,616,739, which is a continuation-in-part of Ser. No. 403,300, Jul. 30, 1982, Pat. No. 4,494,635.

[51] Int. Cl.⁴ .................. F16D 67/04; F16H 37/06
[52] U.S. Cl. ........................ 192/18 A; 192/12 C; 74/665 C; 74/724
[58] Field of Search ............ 192/0.02 R, 0.098, 12 C, 192/18 A, 18 R, 48.3, 48.8, 67 R, 85 A; 74/411.5, 606 R, 665 A, 665 C, 665 H, 724; 188/170

[56] References Cited

U.S. PATENT DOCUMENTS

| | | | |
|---|---|---|---|
| 2,598,633 | 5/1952 | Baldwin | 74/665 C |
| 2,931,424 | 4/1960 | Pickles | 192/67 R X |
| 3,273,415 | 9/1966 | Frost | 192/48.8 X |
| 3,460,656 | 8/1969 | Swanson | 192/87.13 X |
| 3,610,004 | 10/1971 | Neese | 70/186 X |
| 3,696,898 | 10/1972 | Sommer | 192/18 A |
| 4,125,178 | 11/1978 | Monks | 192/18 A |
| 4,245,724 | 1/1981 | Beck | 188/170 |
| 4,464,947 | 8/1984 | Windsor-Smith et al. | 192/48.8 X |
| 4,494,635 | 1/1985 | Sommer | 192/12 C |
| 4,506,772 | 3/1985 | Sommer | 192/18 A |
| 4,616,739 | 10/1986 | Sommer | 192/18 A |

Primary Examiner—Rodney H. Bonck
Assistant Examiner—Richard M. Lorence
Attorney, Agent, or Firm—Harness, Dickey & Pierce

[57] ABSTRACT

An inching drive unit for a brake unit, clutch/brake unit, or the like is disclosed for which an inching motor is able to drive an accessory attached to the main motor through the main motor shaft. The inching drive unit includes a clutch unit for selectively engaging the main motor shaft with a gear mechanism attached to the inching motor drive shaft. A brake is further provided which selectively restricts the rotation of the inching motor drive shaft, and brakes the main motor shaft when the clutch is engaged.

19 Claims, 5 Drawing Sheets

INCHING DRIVE

CROSS-REFERENCE TO RELATED APPLICATION

This application is a continuation of application Ser. No. 726,310, filed Apr. 23, 1985, now abandoned, which is a continuation-in-part of Ser. No. 521,243, filed Aug. 3, 1983, now U.S. Pat. No. 4,616,739, which is a continuation-in-part of Ser. No. 403,300, filed July 30, 1982, now U.S. Pat. No. 4,494,635, issued Jan. 22, 1985.

BACKGROUND AND SUMMARY OF THE INVENTION

The present invention relates generally to a brake unit, a clutch unit or clutch/brake unit combined with an inching drive and, more particularly, to an integrated inching drive for an oil submerged brake unit or clutch/brake unit.

Clutch/brake units and brake units have several applications to which they can be applied. One application involves inching of the output shaft of the unit, such as in setting a male die versus a female die, feeding of sheet metal stock or paper, or use of any type of conveyor, turntable or other automation equipment where indexing may be used. Another application may be to provide progressive die pressing or punching operations. For the clutch/brake unit or brake unit to be applied to these various additional applications which are presently not applicable to clutch/brake units or brake units of the type described, a separate inching motor must be secured as a replacement on the input shaft of the clutch/brake unit externally of the unit to replace whatever drive motor is normally attached to that input shaft or physically replace the main motor and brake unit with an inching drive and brake unit.

Accordingly, it is one object of the present invention to expand the capability of the submerged clutch/brake unit or brake unit to various inching operations with an integrated yet removable inching drive unit. In furtherance of this object, a modular inching drive unit is presented herein which permits the option of inching to be used or not used as described, without inhibiting the various other applications to which the clutch/brake unit or brake unit may be applied.

Another object of the present invention is to provide an inching drive which need not be removed from the clutch/brake unit or brake unit when not used, yet will not effect any other function performed by the clutch/brake unit or the brake unit. Accordingly, a control mechanism is included with the indexing drive having a clutch actuation mechanism which is activated whenever inching movemnt is desired. This actuation mechanism is pneumatically-controlled and the clutch mechanism for the actuation mechanism is submerged in oil. The inching drive mechanism is readily incorporated into a clutch/brake unit with minimal modification of the basic unit, and may be completely removed from the clutch/brake unit without affecting the basic operation of the unit.

Further objects of the present invention are to provide a new and improveed inching drive for a clutch/brake unit or a brake unit of the character described which is simple and compact in design, economical to produce and operate, extremely rugged and mainetnance-free during operation, and adaptable to be selectively employed in a variety of type of automation equipment settings where indexing or inching is desirable.

Other objects and advantages of the present invention will become apparent in the following detailed description taken in conjunction with the accompanying drawings.

DETAILED DESCRIPTION OF THE PREFERRED EMBODIMENTS

Figure 1:
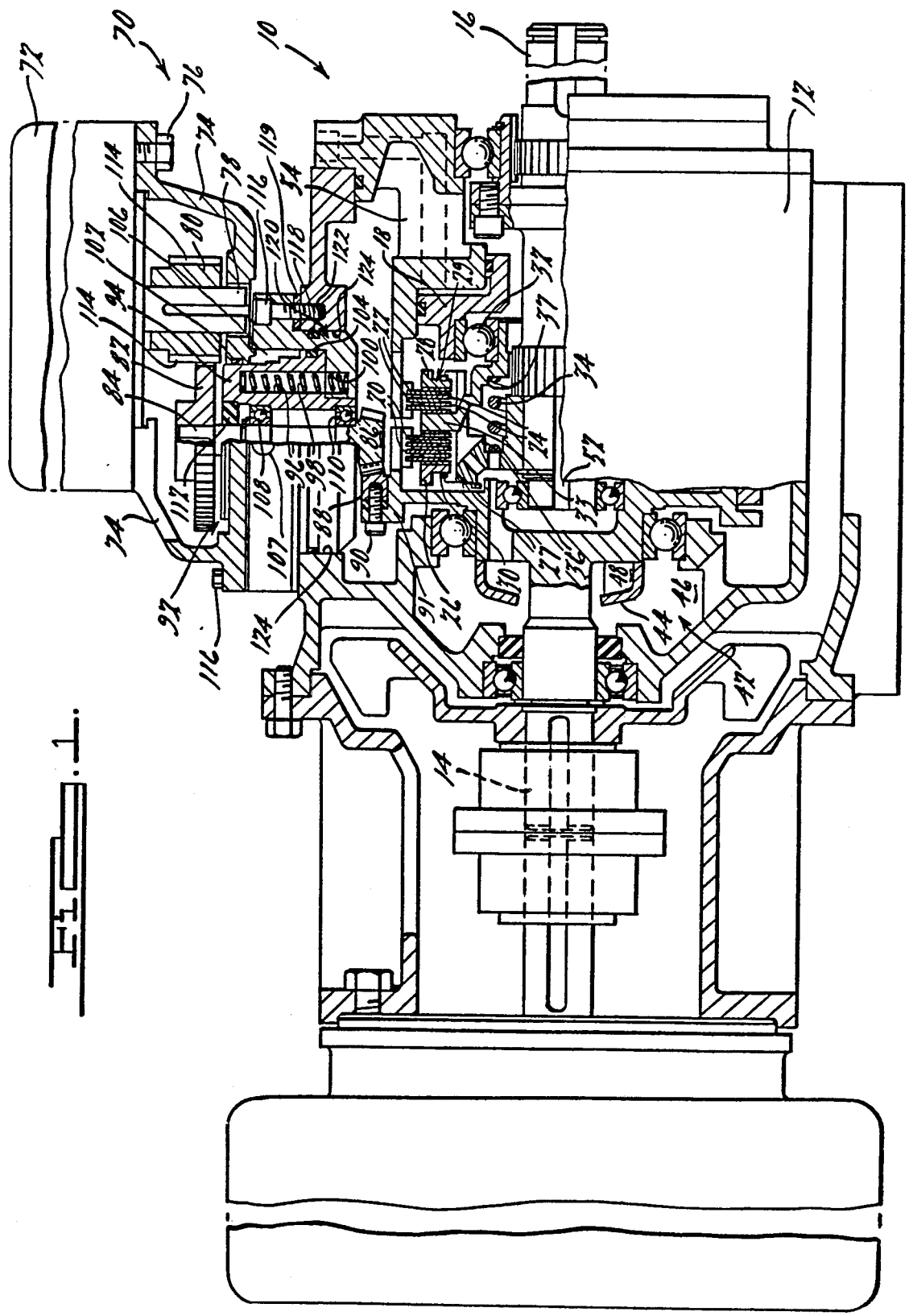
FIG. 1 is a longitudinal side sectional view partially in elevation of a clutch/brake unit having an inching drive of the present invention mounted thereon.
Figure 2:
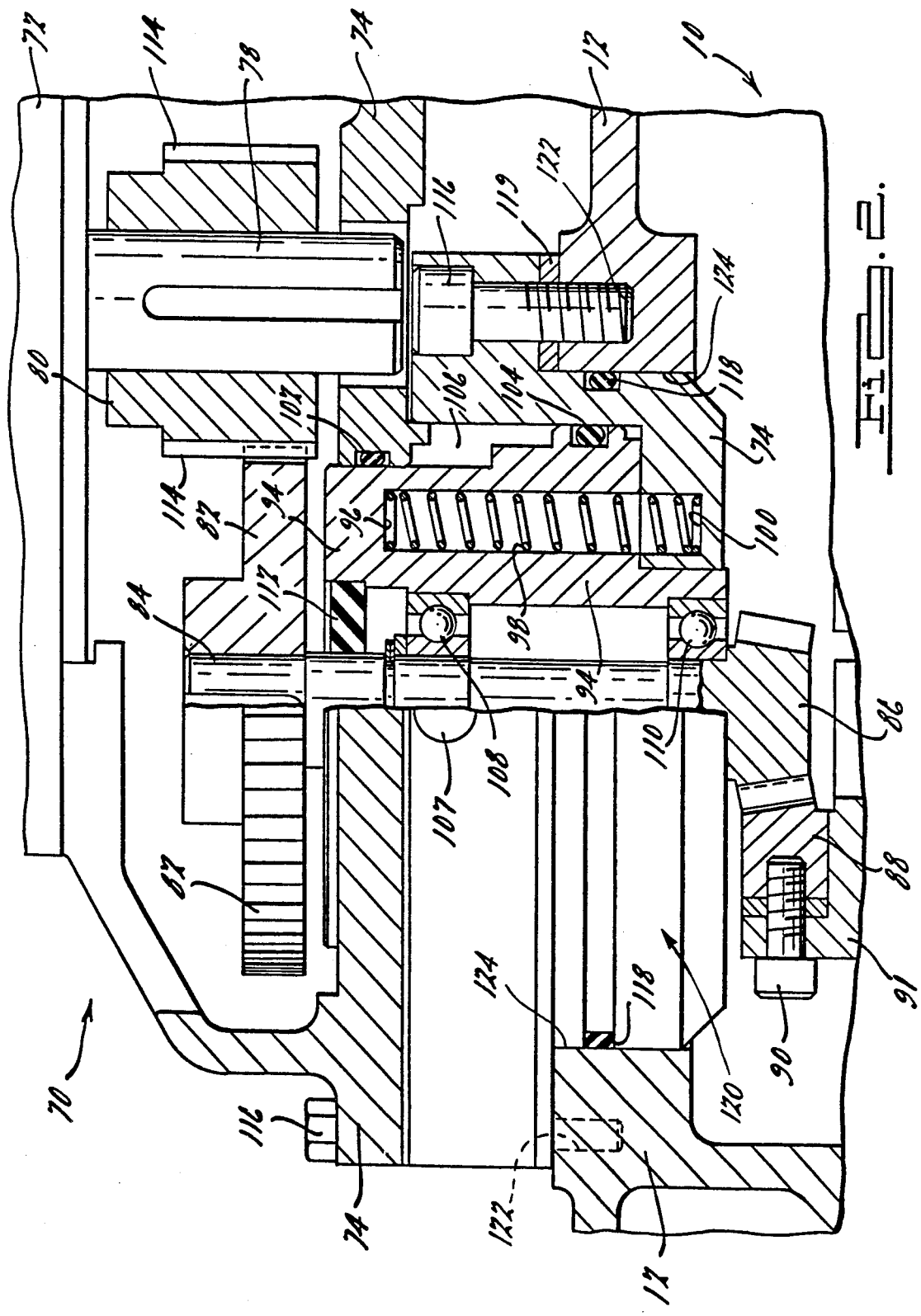
FIG. 2 is an enlarged side sectional view of a portion of the inching drive unit.

Referring to FIG. 1, a clutch/brake unit 10 is illustrated similar to that described in applicant's U.S. Pat. No. 3,696,898, issued Oct. 10, 1972. The clutch/brake unit 10 is comprised of a housing 12, axially aligned input shaft 14 and output shaft 16 mounted in the housing 12, a non-rotatable pneumatically actuated piston 18 in the housing 12, a series of radially disposed clutch plates 20 mounted for rotation with the input shaft 14, a series of radially disposed brake plates 22 spaced axially from the clutch plates 20 and non-rotatably attached to the housing 12, a series of friction discs 24 mounted on the output shaft 16 for rotation therewith and adapted for selective frictional engagement with the clutch 20 and brake plates 22, a fixed clutch actuating member 26 and a fixed brake actuating member 28 carried on the output shaft 16 adjacent the clutch 20 and brake plates 22, securement bolts 30 extending between the last two members 26 and 28, whereby the members 26 and 28 are movable together axially of the output shaft 16, and a bearing 32 disposed betwene the piston 18 and the movable primary clutch and brake actuating member 33 through which the pisotn 18 drives the movable actuating member 33 against the fixed clutch 26 or fixed brake 28 actuating members and thereby actuate the clutch 27 or brake 29. Movement of the piston 18 in one direction serves to simultaneously frictioanlly engage the clutch plates 20 with certain of the friction discs 24 and to release the remaining friction discs 24 from frictional engagement with the brake plates 22 (clutch actuation), and movement of the piston 18 in the other direction serves to simultaneously release the clutch plates 20 from the frictional engagement with certain friction discs 24 and to frictionally engage the remaining friction discs 24 with the brake plates 22 (brake actuation). Springs 34 are mounted between recesses 26 at one end of the output shaft 16 and recesses 37 in the member 33 to normally urge the member 33 toward a position wherein the springs 34 effect engagement of the brake 29 and release the clutch 27. A pumpng mechanism 42 is disposed on the input shaft 14 having a centrifugal pump 44 rotatable with the shaft 14 in an annular chamber 46. The pump 44 has vanes 48 at the outer periphery thereof to direct the fluid into an oil cooler (not shown)

or the oil delivery system of the clutch/brake unit 10, such as passageways 52, 54.

An inching drive mecahnism 70 is mounted to the housing 12. The inching drive mechanism 70 comprises an inching motor 72 and housing 74 which are mounted together by bolts 76. The motor 72 has an output shaft 78 extending into the housing 74 upon which is mounted a first pinion drive gear 80. The gear 80 meshes with a second drive gear 82 mounted on a shaft 84 disposed parallel to the output shaft 78 of the motor 72 and perpendicular to the input 14 and output 16 shafts of the clutch/brake unit 10. The opposite end of the shaft 84 has a beveled pinion gear 86 secured thereto which is engageable with an annular rack gear 88 secured by a plurality of bolts 90 to a radially outwardly extended portion 91 of the input shaft 14 of the clutch/brake unit 10.

Also disposed within the housing 74 is an actuation mechanism 92 for the inching mechanism 70 which comprises an annular piston 94 having a series of recesses 96 in which are disposed one end of a plurality of springs 98, the other end of which springs 98 are disposed in recesses 100 within the housing 74. The housing 74, annular piston 94, and upper 102 and lower 104 seals from an air chamber 106. The annular air chamber 106 is fed pneumatically via port 107 to dispose the annular piston 94 in a downward direction from its pre-actuation position as pre-loaded by the springs 98.

The drive shaft 84 is connected to the annular piston 94 by means of two roller bearings 108, 110 and a seal 112 which maintains the chamber formed by the housing 74 separate from the chamber formed by the housing 12 on the clutch/brake unit 10.

In operation, the piston 94 is set in its normal position vertically upwardly disposed by the preload of the springs 98. Thus, the beveled pinion gear 86 is disposed upwardly out of contact with the annular beveled rack gear 88. Upon pneumatic actuation, the piston 94 is driven vertically downwardly to bring the pinion gear 86 into contact with the beveled rack gear 88. The drive gear 82 is always in contact with the pinion drive gear 80 and slides along the splines 114 thereof. The inching motor 72 is actuated to drive the input shaft 14 of the clutch/brake unit 10 via the extended portion 91, and the clutch 27 of the clutch/brake unit 10 is actuated so that the input shaft 14 drives the output shaft 16 of the clutch/brake unit 10 and thereby any accessory output shaft 16. Actuation of the brake 29 will stop the output shaft 16, after disengaging the clutch 27, and thereby stop powering any accessory driven by the shaft 16.

The inching drive 70 is secured to the clutch/brake unit 10 by a plurality of bolts 116 between housing 74 and housing 12 of the unit 10. An appropriate seal 118 and gasket 119 are also disposed between the housings 12 and 74. If the inching drive need be removed for repair, replacement or otherwise, a cap (not shown) may be placed over the housing 12 of the unit 10 and the unit may continue to operate its other functions without inhibition by removal of the inching drive 70. The inching drive 70 may be added to the clutch/brake unit 10 at any time in the lifetime of the unit 10 as long as the mounting station 120 (with mounting locations 122 and access opening 124) and rack gear 88 exist on the unit 10.

Figure 3:
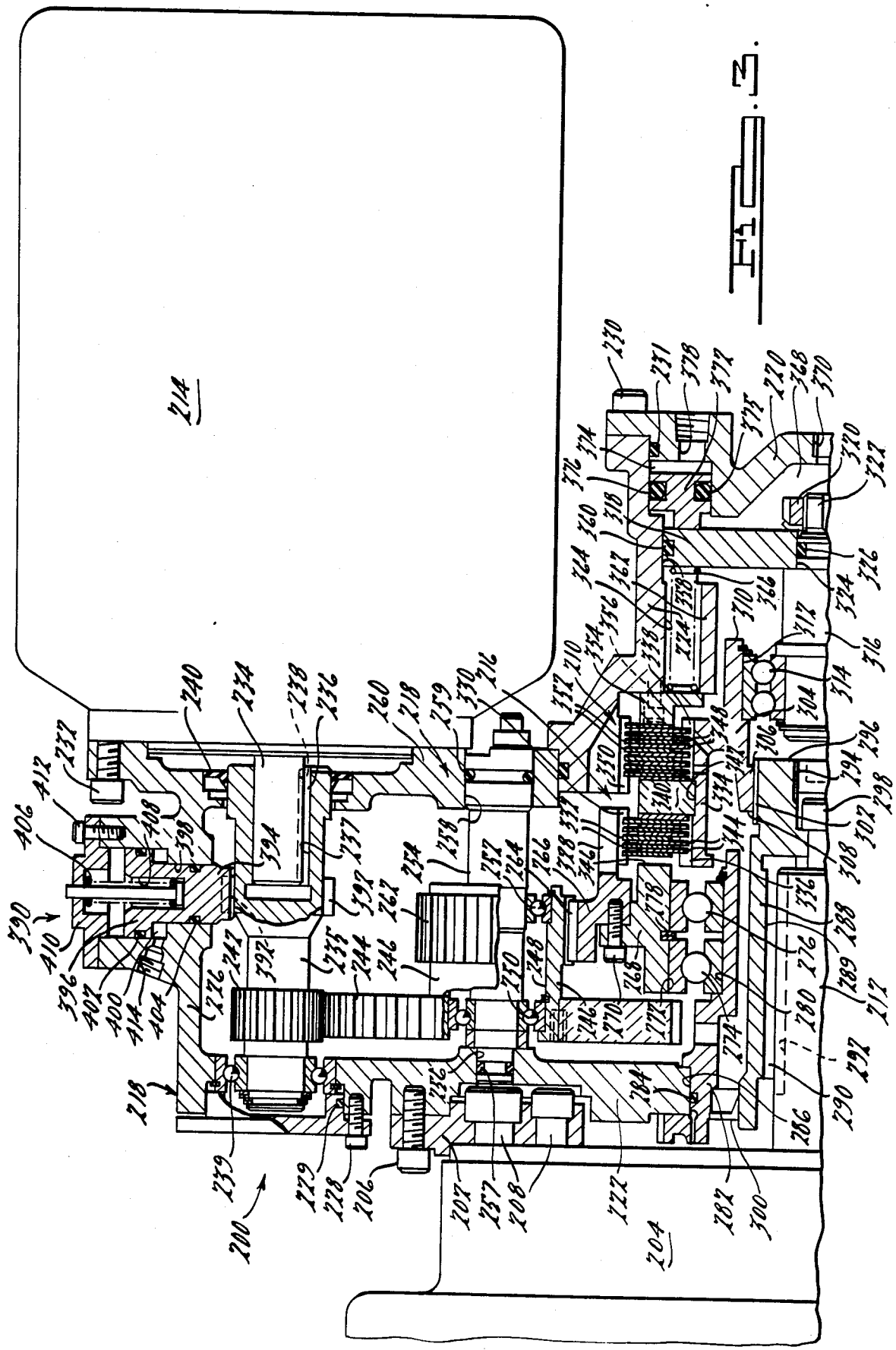
FIG. 3 is a longitudinal side section view partially in elevation of a brake unit having an inching drive of the present invention mounted thereon.

Referring to FIG. 3, an alternative form of the invention is illustrated. A brake unit 200 is shown secured to the frame 202 of a main motor 204 by a plurality of circumferentially spaced bolts 206. The frame 202 is secured to the motor 204 similarly by a plurality of circumferentially spaced bolts 208.

The brake unti 200 comprises a brake 210 for the main shaft 212 of the main motor 204, an inching motor 214, and a clutch 216 for engaging the inchingmotor with the main shaft 212 of the main motor 204 to drive a machine (not shown) via the main shaft 212. The brake 210 and clutch 216 are enclosed by an oil-filled housing 218, comprises of two end walls 220 and 222, an annular housing section 224, and an intermediate gear housing 226. The gear housing 226 is secured to end wall 222 by a plurality of circumferentially spaced bolts 228 and suitable oil seals 229. The annular housing section 224 is secured to the end wall 222 at its lower periphery (not shown) by suitable bolt fasteners and is secured to the gear housing 226 at the upper peripheral interface of the housing section 224. The opposite end of the annular section 224 is secured to end wall 220 by a plurality of circumferentially spaced bolts 230 and suitable oil seals 231.

An inching motor 214 is secured to bolts 232 to the gear housing 226 with the drive shaft 234 of the motor 214 extending into the housing 226. The drive shaft 234 telescopically engages an interior drive shat 235 via a spline 236 on the internal bore 237 of the interior shaft 235 and a keyway 238 on the drive shaft 234. The interior shaft 235 is rotatably mounted within the housing 218 by bearing 239 and appropriately sealed at one end by a seal 240. A pinion gear 242 is disposed on the interior shaft 235 and is rotatable with that shaft 235. The pinion gear 2422 meshes with a first gear 244 which is mounted on a sleeve 246 wherein the pinion gear 242 rotatably drives the sleeve 246 via the gear 244. The sleeve 246 has an internal bore 248 within which two bearings 250 and 252 are disposed. A nonrotating support shaft 254 extends from a bore 256 having a suitable seal 257 in the end wall 222 through the bearings 250 and 252 into a bore 258, also having a seal 259, in an oppositely disposed end wall 260 of the gear housing 226 to support the sleeve 246.

Sleeve 246 has a second gear 262 fixedly disposed at the outer periphery thereof, rotatable with the sleeve 246, axially spaced from the first gear 244, and generally having a different (smaller) diameter than the first gear 244. This second gear 262 meshingly engages the teeth 264 of a first annular member 266. The first annular member 266 is secured to a second annular member 268 by a plurality of circumferentially spaced bolts 270. The second annular member 268 has an interior bore 272 within which is disposed a pair of bearings 274 and 276 seeparated by a snap ring 278. The bearings 274 and 276 are mounted in an annular recess 280 around the outer periphery of an axially extending stationary annular sleeve 282 affixed to the inner periphery of end wall 222 with a suitable seal 184 at the interface of the wall 222 and the sleeve 282, comprising an annular groove 286 within which the wall 222 is inserted. Either the wall 222 or the sleeve 282 are comprised of multiple pieces to facilitate assembly.

A cylinder power transmitting member 288 disposed within the sleeve 282 encapsulates and is connected to the main shaft 212 within the bore 289 of the member 288. The member 288 has a spline 290 which is inserted within a keyway 292 in the shaft 212 and also has a bore 294 at one end 296 thereof through which a bolt 298 is threadably associated with the shaft 212. A suitable seal 300 is disposed between the sleeve 282 and the cylindrical member 288.

The external peripheray of the cylindrical member 288 includes a series of splines forming a gear 302. An annular first power transmitting member 304 is disposed around the gear 302 and includes teeth 306 along one end 308 of its inner periphery that mesh with the splines of gear 302. The other end 310 of the inner periphery of the member 304 includes a recess 312 within which a bearing 314 is disposed. The bearing 314 is mounted on a stub shaft 316 secured to a piston head 318 by means of a nut 320 threadably secured to an extended threaded portion 322 of the shaft 316 disposed through a bore 324 in the piston head 318 along with a suitable seal 326.

The clutch 216 includes an extended annular portion 328 integral with the first annular member 266, which extended portion has a plurality of longitudinally extending drive lugs 330 disposed at circumferentially spaced locations along the inner periphery thereof. A series of friction clutch plate members, generally designated 332, are each provided with a plurality of circumferentially spaced, radially inwardly extending notches adapted for keyed engagement with the drive lugs 330.

The annular first power transmitting member 304 includes an annular extended portion 334 having two sets 336 and 338 of longitudinally extending, circumferentially spaced spline formations disposed one set at the radially outer periphry thereof and disposed on each side of a snap ring 340 positioned in a groove 342 of the extended portion 334. A series of friction clutch disc members, genererlaly designaged 344, are provided with internal notches complementary to the formations 336 and adapated for splined engagement with those formations 336. In assembly, the clutch plates 332 and discs 344 are interleaved between the snap ring 340 and an abutment surface 346 of the second annular member 268 to be capable of engagment and disengagement via oil shear upon proper movement of the first power tranmitting member 304 as will be discussed below.

The brake 210 includes a series of friction brake disc members, generally designated 348, which are provided with internal notches complementary to the second set of formations 338 and adapted for splined engagement with those formations 338.

Annular housing section 224 includes a series of longitudinally extending, circumferentially spaced lugs 350. A series of friction brake plate members, generally designated 352, are each provided with a plurality of circumferentially spaced, radially inwardly extending notches adapted for keyed engagement with the lugs 350. In assembly, the brake discs 348 and plates 352 are interleaved between the snap ring 340 and an annular brake abutment 354 a ffixed to the housing wall 224 by suitable bolts 356 so that the discs 348 and plates 352 are capable of engagement and disengagment via oil shear again upon proper movement of the first power transmitting member 304 as will be discussed below.

The piston head 318 moves along the inner peripheral surface 358 of housing wall 224 with a suitable seal 360 between the piston head 318 and the inner surface 358. The housing wall 224 includes a radially inwardly extending flange 362 through which a series of bores 364 are disposed and closed at one end by abutment 354. Compression springs 366 are positioned in the bores 364 and act in assembly against both the abutment 354 and the piston head 318 to bias the piston head 318.

A first air chamber 368 is formed by piston head 318, housing side wall 224, and housing end wall 220. An air port 370 is disposed in end wall 220 to communicate a source of pressurized air with the chamber 368.

A second annular piston 372 acts against the first piston 318 and moves in a chamber 374 formed by the piston 372, housing side wall 224, and housing end wall 220. Suitable seals 375 and 376 are disposed at the inner and outer peripheries, respectively, of the piston 372. A second port 378 is disposed in end wall 220 to communicate a source of pressurized air with the chamber 374.

In operation, a person may select one of the two types of drive motors or brake the device. The unit 200 is biased into a braking position by the springs 366 against the first piston head 318 which moves to the right in FIG. 3 to force the first power transmitting member 304 to the right to interact the brake discs 348 oand plates 352 via oil shear to brake the rotating member 304 and thereby the shaft 212. If the main drive motor 204 is to be used, pressurized air is supplied to second piston chamber 374 via port 378, which forces the second piston 372 against the first piston head 318 to overcome the bias of the springs 366 and release the brake 210.

A sufficient gap exists between the abutment surface 346 and the snap ring 340 whereby release of the brake 210 by piston 372 does not engage the clutch 216. Once the main motor 204 is stopped, the inching drive 214 may be used by suppling pressurized air to the first chamber 368 via port 370 to both disengage the brake 210 and also engage the clutch 216 so that the inching drive motor 214 drives a device through the shaft 212 of the main motor. Thus, different types of drives may be used without manual disconnection of the motor from the driven device.

A pneumatically released safety 390 is also provided so that the inching drive motor 214 does not interfere with the desired operatins when not intended to be used. The interior shaft 235 includes lugs 392 on the outer periphery thereof which engage one end 394 of a piston 396. The piston 36 is disposed in a cylindrical bore 398 in gear box wall 226. A chamber 400 is formed by the bore 398, the piston 396, and upper 402 and lower 404 annular seals between the piston 396 and the bore 398. The piston 396 is biased into engagement with the shaft 235 by a spring 406 disposed within an internal bore 408 of the piston 396 and abutting against a cap 410 affixed to the wall 226 by suitable bolts 412. A port 414 selectively communicates pressurized air to the chamber 400 to release the safety 390. Of course, the supply of pressurized air to the safety chamber 400 may be coordinated with supply of air to the first piston chamber 368 for maximum utility of the safety.

Any of a number of known devices can be used for selection of supply of pressurized air to the various ports 370, 378 and 414 and need not be discussed here.

Figure 4:
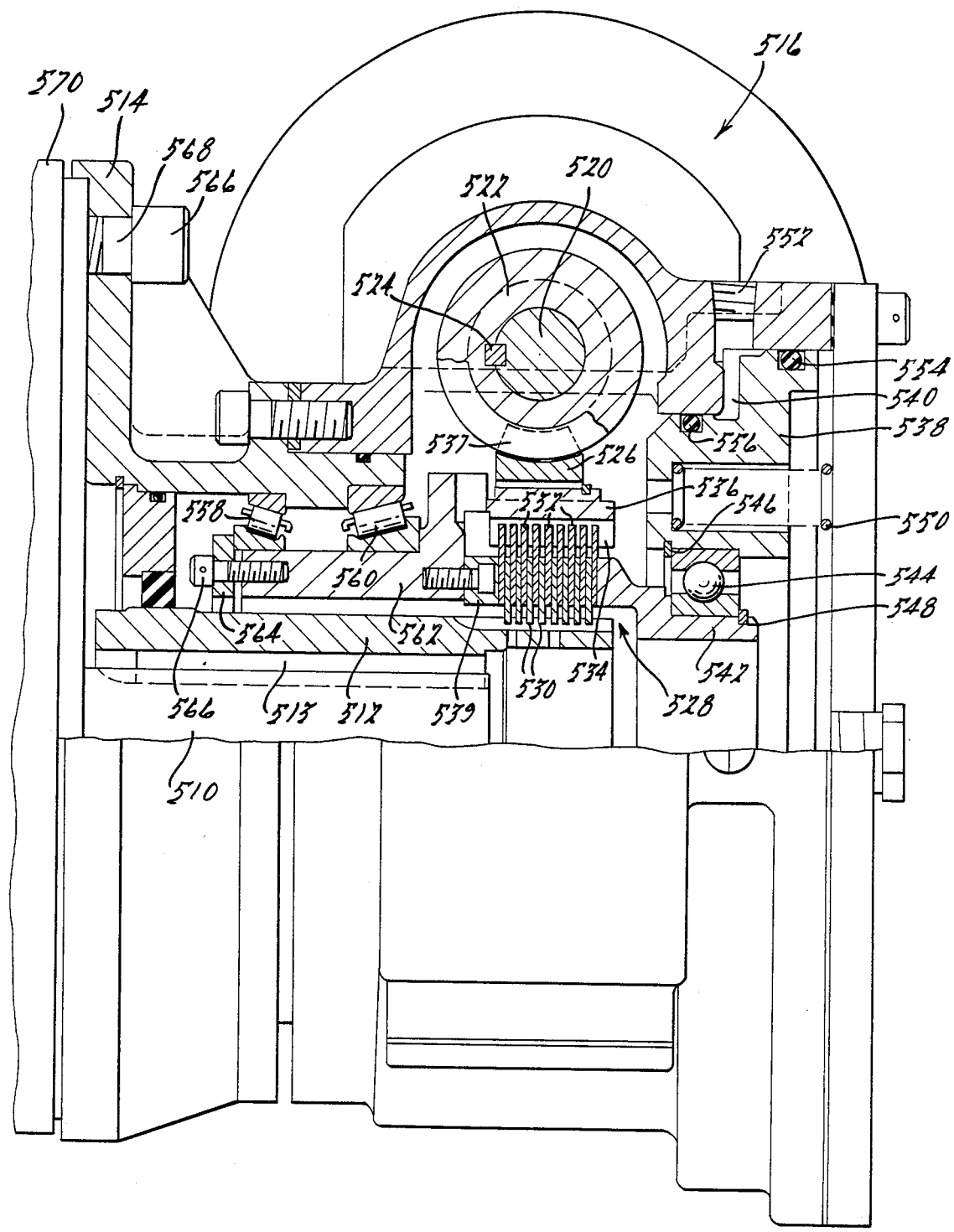
FIG. 4 is a longitudinal side sectional view partially in elevation of a clutch/brake unit able to incorporate an inching drive of the present invention.
Figure 5:
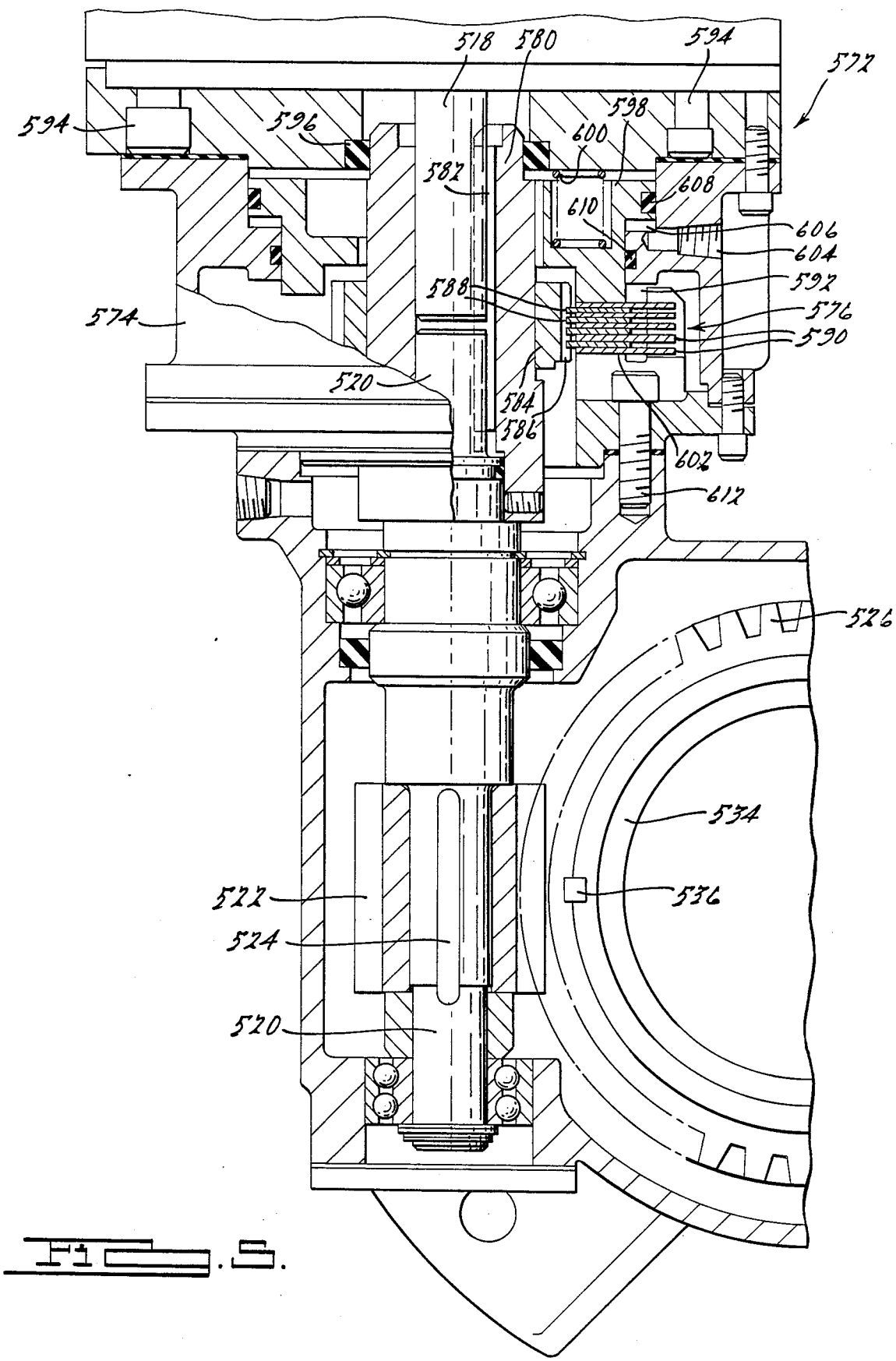
FIG. 5 is a longitudinal side sectional view partially in elevation of a brake and having an inching drive of the present invention mounted thereon.

Referring to FIGS. 4 and 5, a further alternative embodiment of the present invention is illustrated. In this alternative embodiment, the main motor shaft of an associated drive motor for automation equipment or the like is connected to a clutch located in a clutch/brake housing. An inching motor is provided which is able to drive the main motor shaft when the clutch elements are engaged. A brake unit is further provided which is able to prevent rotation of the inching motor drive shaft when the brake elements are engaged. Accordingly, the inching motor is able to selectively drive the automation equipment through the main motor shaft when the clutch is engaged depending on the actuation of the brake.

To more specificlaly describe the second embodiment of the present invention referred to above, the main motor shaft 510 of the main motor (not shown) is connected to an annular member 512 by key 513 and is located inside the main housing 514 of the clutch/brake unit 516. To allow an inching motor (not shown) to drive the main motor shaft 510, the inching motor drive shaft 518 of the inching motor communicates with a rotatable member 520 which is secured to a worm gear 522 by a key 524. The worm gear 522 is able to drive a ring gear member 526 which rotates the main motor shaft 510 when a clutch 528 associated with the clutch/brake unit 516 is pneumatically deactuated.

For selective actuation of the clutch 528, the clutch 528 includes a plurality of axially fixed radially disposed clutch plates 530 mounted on the annular member 512. To provide for frictionally engagement of the clutch plates 4530, a first plurality of radially extending parallel friction discs 532 are mounted on an extended portion 534 of the ring gear member 526. The extended portion 534 and the ring gear member 526 are coupled by a key 536 to ensure that the extended portion 534 and the ring gear member 526 rotate in unison. The friction discs 532 are interleaved or interjacent with the clutch plates 530 and are capable of frictionally engaging the clutch plates 530. the ring gear member 526 has a series of gear teeth 537 located on its radially outer periphery which successively engage the worm gear 522. Acordngly, when the friction discs 532 engage the plates 530, the friction discs 532 are driven by the extended portion 534 and the ring gear member 526 which enables the rotatable member 520 to drive the main motor shaft 510.

To provide for selective frictional engagment between the clutch plates 530 and the friction discs 532, a first nonrotatable pneumaticlaly actuated piston 538, defining a first annular piston chamber 540, is located within the clutch/brake housing 514. Movement of the first piston 538 in one direction (leftward in FIG. 4) serves to simultaneously frictionally engage the clutch plates 530 with the friction discs 532 by movement of the first clutch actuating portion 542 toward the stop portion 539. Similarly, movement of the first piston 538 in the opposite direction (i.e., to the right in FIG. 4) serves to release the clutch plates 530 from frictional engagement with the friction discs 532. To allow rotation of the first clutch actuating portion 542 with respect to the clutch/brake housing 514, a bearing 544 is located on the clutch actuating portion 542 and is secured thereto by snap rings 546 and 548.

To urge piston 538 in the first direction in which the clutch plates 530 engage the first friction discs 532, a plurality of springs 550 are mounted in the recess of the first piston 538. To provide for selective disengagmenet of the clutch 528, the annular piston chamber 540 pneumatically communicates with a threaded inlet 552 located between the housing 514 and the first piston 538. Pressurization of the chamber 540 caused rightward movement of the piston 538 in FIG. 4 which disengages the clutch plates 530 from the first friction discs 532. To prevent pneumatic leakage upon pressurization of the chamber 540, two seals 554 and 556 are provided between the first piston 538 and the housing 514.

To allow movement of the ring gear member 526 relative to the housing 514, two bearing assemblies 558 and 560 are provided between the protrusion 562 of the ring gear member 526 and the housing 514. The inner race of the bearng 558 is secured to the protrusion 562 by an annular ring 564 and the bolts 566 which threadably engage the protrusion 562. To support the main housing 514, a plurality of bolts 566 are provided which pass through the aperatures 568 in the housing 514 and threadably engage the main motor mounting 570.

An inching drive mechanism 572 is mounted on a second housing 574 and mechanically communicates with a brake 576. The inching drive mechanism 527 comprises an inching motor (not shown) which has a drive shaft 518 extending into the housing 574. An annular member 580 is mounted on both the drive shaft 518 and the shaft 520. The annular member 580 is secured to the shafts 518 and 520 by keys 582 and includes radially extending lugs 584 each having respective axially parallel brake plates 588. A second plurality of radially extending parallel friction brake discs 590 interleaved or interjacent with the brake plates 588 and attached to the housing 574 via a series of extended circumferentially spaced lugs 592 combine to form the brake 576. Threaded bolts 594 are provided to secure the inching motor to the housing 574. The appropriate seal 596 is also disposed between the housing 574 and the annular member 580 to prevent leakage.

To engage the brake plates 588 with the friction discs 590, a second nonrotatable pneumatically actuated piston 598 is located within the housing 574. Movement of the second piston 598 in a first direction (downwardly in FIG. 5) serves to simultaneously frictionally engage the brake plates 588 with the friction discs 590, and movement of the piston 598 in the opposite direction (upwardly in FIG. 5) serves to simultaneously release the brake plates 588 from frictional engagement of the friction discs 590. The springs 600 are mounted in the recess of the second piston 598 to urge the piston 598 toward a position where the pisotn 598 causes engagement of the brake plates 588 with the friction discs 590 against a nonrotatable stop portion 602 of the housing 574.

To counteract the preload of the springs 600, an inlet 604 is provided in the housing 574 which allows piston chamber 606 to communicate with a suitable source of pressurized air to force the stop portion 602 and the piston 598 apart, thus counteracting the preload of the springs 600. Two seals 608 and 610 are provided between the piston 598 and the housing 574 to seal the chamber 606.

With both the clutch 528 and the brake 576 released, the main motor is free to operate the automation equipment under full speed conditions. At such time as it is desired to operate the automation equipment at some preselected reduction speed (1/10 of full speed, for example in the embodiment disclosed in FIGS. 4 and 5, as determined by the gear ratio of gears 522 and 526) clutch 528 can be engaged, thereby drivingly connecting the inching motor via ring and worm gears 526 and 522 with the shaft 510. More specifically, in normal operation of the inching drive mechanism 572, the second piston 598 is set vertically upwardly as a result of the pressurization of the chamber 606. In this position, the second friction discs 590 do not engage the brake plates 588, with the result that upon actuation of the clutch 528, the inching motor is able to drive the shaft 510 via the worm and ring gears 522 and 526, thereby allowing rotation of the main motor shaft 510 when the clutch 528 is pneumatically deactuated. Upon pneumatic deactuation of the piston 598, the piston 598 is driven vertically downwarldy by the preload of the springs 600 to force the friction discs 590 and plates 588 together against the top portion 602 of the housing 574, thereby preventing the rotation of both the inching motor drive shaft 518 and the main motor shaft 510. By controlling both the brake 576 and the clutch 528 as described above, the inching motor can selectively drive the main motor shaft 510 and the accessor, i.e., automation equipment or the like, communicating therewith.

The inching drive mechanism 572 is attached to the clutch/brake unit 516 by a plurality of bolts 612 located between main housing 514 and second housing 574 of the unit 516. If the inching drive mechanism 572 is removed for repairs, replacement or otherwise, a cap (not shown) may be placed over the housing 514 of the unit 516 and the main motor may continue to drive the automation equipment without inhibition. The inching drive mechanism 572 may be added to the clutch/brake unit 516 at any time during the lifetime of the unit 516 as long as a compatible mounting station exist on the unit 516.

An alternative method of operation of the apparatus of FIGS. 4 and 5 is to maintain the brake 576 in an actuated (locked) condition and to use the clutch 528 as a motor brake which would brake the main motor by "grounding" the main motor shaft 510 to the housing through selective actuation of the clutch 528.

While it will be apparent that the preferred embodiemnts as illustrated herein are well calculated to fulfill the objects above stated, it will also be appreciated that the present invention is susceptible to modification, variation and change without departing from the proper scope or fair means of the subjoined claims.

What is claimed is:

1. An inching drive unit for a cluth/brake unit, said clutch/brake unit having a main housing operatively associated with a main motor shaft, said clutch/brake unit further having a rotatable member operably associated with said main housing and able to drive said main motor shaft, said inching drive unit comprising:
   inching motor means for driving said inching drive unit, said inching motor means having an inching drive shaft extending therefrom;
   a second housing secured to said inching motor means and removabley secured to said main housing, said inching motor drive shaft of said inching motor means extending into said second housing;
   means for causing rotation of said rotatable member by said inching motor comprising an annular member rotatably connecting said inching motor drive shaft to said rotatable member;
   brake means disposed within said second housing and operably associated with said annular member, said brake means including a series of brake plates rotatably secured to said annular member and a series of friction discs secured to said second housing and interleaved with said brake plates;
   means for selectively engaging said brake plates with said friction discs comprising a piston means nonrotatably secured within said second housing and means for selectively biasing said piston means to allow said brake plates to selectively engage said friction discs and thereby prevent rotation of said inching motor drive shaft and said rotatable member; and
   clutch and gear means within said clutch/brake unit for selectively engaging said main motor shaft with said rotatable member, said clutch and gear means associated with said inching drive unit such that said inching drive unit is able to rotate said main motor shaft when said clutch and gear means is engaged and said brake means is disengaged, and said clutch and gear means being further able to prevent rotation of said main motor shaft when said inching drive unit brake means is engaged.

2. An inching drive unit according to claim 1, wherein said inching drive unit is removvbly mounted to said main housing and where removal or attachment of said inching drive unit does not inhibit the rotation of said main motor shaft.

3. An inching drive unit according to claim 1, wherein said means for selectively engaging said brake means includes a spring means disposed within said second housing and biasing said piston means in a first direction perpendicular to the plane of rotation of said brake plates to prevent rotation of said inching motor drive shaft and said rotatable member when said spring means is in its expanded state.

4. An inching drive unit according to claim 3, wherein said means for selectively engaging said brake means further includes means for selectively counterbiasing said piston means in a second direction perpendicular to the plane of rotation of said brake plates to allow rotation of said inching motor drive shaft and said rotatable member when said sprng means is in its compressed state.

5. An inching drive unit for a clutch/brake unit, said clutch/brake unit having a main housing with an interior portion and a main motor shaft operably associated with said main housing, said inching drive unit comprising:
   inching motor means for driving said inching drive unit, said inching motor means having an inching motor drive shaft extending therefrom;
   a second housing secured to said inching motor means and to said main housing, said inching motor drive shaft of said inching motor means extending into said second housing;
   a rotatable member disposed within said second housing and extending into said main housing;
   an annular member rotatably communicating with said inching motor drive shaft and said rotatable member;
   brake means disposed within said second housing and operatively associated with said inching motor drive shaft including first friction disc means fixedly disposed within said second housing adjacent to said annular member and first friction plate means secured to said annular member and engageable with said first friction disc means;
   clutch means disposed adjacent to said main motor shaft within said main housing including second friction plate means and second friction disc means operably associated with said second friction plate means and engageable therewith; and
   means for selectively engaging said clutch means comprising a first piston means nonrotatably secured within a piston chamber located within the interior portion of said main housing, movement of said first piston means within said piston chamber being operatively dependent upon pressurization of a region of said piston chamber, said second friction plate means and said second friction disc means engageable by movement of said first piston means, said means for selectively engaging said clutch means permitting said inching motor means to drive said main motor shaft when said brake means is disengaged, said clutch means further able to prevent rotation of said main motor shaft when said brake means is engaged.

6. An inching drive unit according to claim 5, wherein said inching drive unit is removably mounted to said main housing and where removal or attachment of said inching drive unit does not inhibit rotation of the main motor shaft.

7. An inching drive unit according to claim 5 further including means for selectively engaging said brake means comprising a second piston means nonrotatably secured within said second housing and means for selectively biasing said second piston means to allow said brake means to selectively engage and thereby prevent rotation of said inching motor drive shaft and said rotatable member.

8. An inching drive unit according to claim 7, wherein said inching drive unit is removably mounted to said main housing and where removal or attachment of said inching drive unit does not inhibit rotation of the main motor shaft.

9. An inching drive unit according to claim 7, wherein said means for selectively engaging said brake means includes a spring means disposed within said second housing and biasing said second piston means in a first direction to prevent rotation of said inching motor drive shaft and said rotatable member when said spring means is in its expanded state.

10. An inching unit according to claim 9, wherein said inching drive unit is removably mounted to said main housing and where removal or attachment of said inching drive unit does not inhibit rotation of the main motor shaft.

11. An inching unit according to claim 9, wherein said means for selectively engaging said brake means further includes means for selectively counterbiasing said second piston means in a second direction to allow rotation of said inching motor drive shaft and said rotatable member when said spring means is in its compressed state.

12. An inching according to claim 11, wherein said inching drive unit is removably mounted to said main housing and where removal or attachment of said inching drive unit does not inhibit rotation of the main motor shaft.

13. An inching drive unit for a clutch/brake unit for driving a main motor, said main motor haviing a main motor shaft operatively associated with said clutch/brake unit, said inching drive unit comprising:

an inching motor for selectively rotating said main motor shaft, said inching motor having an inching motor drive shaft able to cause said main motor shaft to rotate;

a housing secured to said inching motor and removably secured to said clutch/brake unit, said inching motor drive shaft extending into said housing;

pneumatically controlled brake means for selectively restricting the rotation of said inching motor drive shaft, said brake means disposed within said housing and including a first pneumatically actuated piston means oriented to cause selective engagement of said brake means;

pneumatically controlled clutch means for selectively causing rotation of said main motor shaft by said inching motor drive shaft when said brake means is pneumatically disengaged, said clutch means including a second pneumatically actuated piston means oriented to cause selective engagement of said clutch means; and gear means for allowing said main motor shaft to be driven by said inchng motor when said brake means is pneumatically disengaged and said clutch means is engaged, said gear means further able to restrict rotation of said main motor shaft when said brake means is engaged and said clutch means is engaged said gear means including first and second gears, said first gear driven by said inching motor drive shaft and mechanically communicating with said second gear, said second gear able to selectively drive said main motor shaft.

14. An inching drive unit according to claim 13, wherein said inching drive unit is removably mounted to said main housing and where removal or attachment of said inching drive unit does not inhibit rotation of said main motor shaft.

15. An inching drive unit according to claim 13, wherein said first pneumatically actuated piston means includes a first spring means for biasing said first piston means in a first direction to prevent rotation of said inching motor drive shaft when said first spring means is in its expanded state.

16. An inching drive unit according to claim 15, wherein said first pneumatically actuated piston means includes first means for selectivley counterbiasing said first piston means in a second direction to allow rotation of said inching motor drive shaft when said first spring means is in its compressed state.

17. An inching drive unit according to claim 16, wherein said second pneumatically actuated piston means includes a second spring means for biasing said second piston means in a third direction to allow said second gear to drive said main motor shaft when both said second spring means is in its expanded state and said brake means is disengaged.

18. An inching drive unit according to claim 17, wherein said second pneumatically actuated piston means further includes means for counterbiasing said second piston means in a fourth direction to prevent said second gear from driving said main motor shaft.

19. An inching unit according to claim 18, wherein said inching drive unit is removable mounted to said main housing and where removal or attachment of said inching drive unit does not inhibit the rotation of said main motor shaft.

* * * * *

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Title page:

ON THE ABSTRACT under Line 9, "brakes" should be --ends--;

Col. 1, Line 44, "described" should be --desired--;

Col. 1, Line 54, "movemnt" should be --movement--;

Col. 1, Line 63, "improveed" should be --improved--;

Col. 1, Lines 66, 67, "mainetnance-free" should be --maintenance-free--;

Col. 1, Line 68, "type" should be --types--;

Col. 2, Line 45, "betwene" should be between--;

Col. 2, Line 47, "pisotn" should be --piston--;

Col. 2, Line 51, "frictioanlly" should be --frictionally--;

Col. 2, Line 60, "26" should be --36--;

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Col. 2, Line 64, "pumpng" should be --pumping--;

Col. 3, Line 3, "mecahnism" should be --mechanism--;

Col. 3, Line 25, "from" should be --form--;

Col. 4, Line 3, "unti" should be --unit--;

Col. 4, Line 5, "inchingmotor" should be --inching motor--;

Col. 4, Line 9, "comprises" should be --comprised--;

Col. 4, Line 24, "shat" should be --shaft--;

Col. 4, Line 31, "2422" should be --242--;

Col. 4, Line 51, "seeparated" should be --separated--;

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Col. 4, Line 55, "184" should be —284—;

Col. 5, Line 1, "peripheray" should be —periphery—;

Col. 5, Line 26, "periphry" should be —periphery—;

Col. 5, Line 29, "generlaly designaged" should be —generally designated—;

Col. 5, Lines 36, 37, "tranmitting" should be —transmitting—;

Col. 5, Line 51, "a ffixed" should be —affixed—;

Col. 5, Line 53, "disengagment" should be —disengagement—;

Col. 6, Line 13, "oand" should be —and—;

Col. 6, Line 24, "suppling" should be —supplying—;

Col. 6, Line 33, "operatins" should be —operations—;

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Col. 6, Line 36, "36" should be —396—;

Col. 6, Line 66, "specificlaly" should be —specifically—;

Col. 7, Line 14, "frictionally" should be —frictional—;

Col. 7, Line 15, "4530" should be —530—;

Col. 7, Line 23, "the" (second occurence), should be —The—;

Col. 7, Lines 25, 26, "Accordngly" should be —Accordingly—;

Col. 7, Line 33, "pneumaticlaly" should be —pneumatically—;

Col. 7, Line 51, "disengagmenet" should be —disengagement—;

Col. 7, Line 65, "bearng" should be —bearing—;

Col. 8, Line 1, "aperatures" should be —apertures—;

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Col. 8, Line 12, after "axially" insert --extending splines 586 which engages a plurality of radially extending--;

Col. 8, Line 32, "pisotn" should be --piston--;

Col. 8, Line 64, "downwarldy" should be --downwardly--;

Col. 8, Line 67, "top" should be --stop--;

Col. 9, Line 3, "accessor" should be --accessory--;

Col. 9, Line 10, "repairs" should be --repair--;

Col. 9, Line 16, "exist" should be --exists--;

Col. 9, Lines 24, 25, "embodiemnts" should be --embodiments--;

Col. 9, Line 29, "means" should be --meaning--;

Col. 9, Line 41, "removabley" should be --removably--;

UNITED STATES PATENT AND TRADEMARK OFFICE
CERTIFICATE OF CORRECTION

PATENT NO. : 4,765,448

DATED : August 23, 1988

INVENTOR(S) : Gordon M. Sommer

It is certified that error appears in the above-identified patent and that said Letters Patent is hereby corrected as shown below:

Col. 10, Line 5, "removbly" should be --removably--;

Col. 10, Line 23, "sprng" should be --spring--;

Col. 11, Line 38, insert --unit-- after "inching";

Col. 11, Line 44, "haviing" should be --having--;

Col. 12, Line 35, "selectivley" should be --selectively--;

Col. 12, Line 52, "removable" should be --removably--.

Signed and Sealed this

Thirteenth Day of June, 1989

Attest:

DONALD J. QUIGG

*Attesting Officer*     *Commissioner of Patents and Trademarks*